US012644073B2

(12) United States Patent
Fujimoto et al.

(10) Patent No.: US 12,644,073 B2
(45) Date of Patent: Jun. 2, 2026

(54) COMPOSITION COMPRISING MONOCHLOROTRIFLUOROPROPENE AND STABILIZER, AND ITS APPLICATIONS

(71) Applicant: AGC Inc., Tokyo (JP)

(72) Inventors: Atsushi Fujimoto, Tokyo (JP); Satoshi Kawaguchi, Tokyo (JP); Hiroaki Mitsuoka, Tokyo (JP)

(73) Assignee: AGC Inc., Tokyo (JP)

( * ) Notice: Subject to any disclaimer, the term of this patent is extended or adjusted under 35 U.S.C. 154(b) by 259 days.

(21) Appl. No.: 18/333,046

(22) Filed: Jun. 12, 2023

(65) Prior Publication Data

US 2023/0332074 A1    Oct. 19, 2023

Related U.S. Application Data

(63) Continuation of application No. PCT/JP2021/048313, filed on Dec. 24, 2021.

(30) Foreign Application Priority Data

Dec. 28, 2020    (JP) ................................. 2020-219180

(51) Int. Cl.
| | |
|---|---|
| *C11D 3/24* | (2006.01) |
| *C09D 7/20* | (2018.01) |
| *C09K 5/10* | (2006.01) |
| *C11D 3/00* | (2006.01) |

(52) U.S. Cl.
CPC ................ *C11D 3/245* (2013.01); *C09D 7/20* (2018.01); *C09K 5/10* (2013.01); *C11D 3/0036* (2013.01)

(58) Field of Classification Search
CPC ... C11D 3/0036; C11D 3/2075; C11D 3/2079; C11D 3/24; C11D 3/245; C09D 7/20; C09K 5/10
See application file for complete search history.

(56) References Cited

U.S. PATENT DOCUMENTS

| | | | |
|---|---|---|---|
| 2012/0161063 A1* | 6/2012 | Singh ....................... | C11D 7/50 |
| | | | 549/279 |
| 2013/0090280 A1 | 4/2013 | Basu et al. | |
| 2014/0070129 A1* | 3/2014 | Kennoy ................... | C09K 3/00 |
| | | | 516/8 |
| 2016/0023034 A1 | 1/2016 | Elsheikh et al. | |

FOREIGN PATENT DOCUMENTS

| | | |
|---|---|---|
| JP | 2013-504658 A | 2/2013 |
| JP | 2016-519053 A | 6/2016 |
| JP | 2019-535841 A | 12/2019 |
| JP | 2020-139022 A | 9/2020 |
| WO | WO 2017/018412 A1 | 2/2017 |
| WO | WO-2017/122801 A1 | 7/2017 |

OTHER PUBLICATIONS

International Search Report issued Mar. 15, 2022 in PCT/JP2021/048313 filed on Dec. 24, 2021 3 pages.

* cited by examiner

*Primary Examiner* — Brian P Mruk

(74) *Attorney, Agent, or Firm* — Oblon, McClelland, Maier & Neustadt, L.L.P.

(57) ABSTRACT

To provide a composition which is excellent in solubility of various organic substances, presents no adverse effects on the global environment and is excellent in stability. A composition comprising a monochlorotrifluoropropene and at least one stabilizer selected from the group consisting of a carboxylic acid, a carboxylic acid salt and a carboxylic acid ion, characterized in that the content of the stabilizer to the total content of the monochlorotrifluoropropene and the stabilizer is from 0.1 to 500 mass ppm.

15 Claims, No Drawings

COMPOSITION COMPRISING MONOCHLOROTRIFLUOROPROPENE AND STABILIZER, AND ITS APPLICATIONS

This application is a continuation of PCT Application No. PCT/JP2021/048313, filed on Dec. 24, 2021, which is based upon and claims the benefit of priority from Japanese Patent Application No. 2020-219180, filed on Dec. 28, 2020. The contents of those applications are incorporated herein by reference in their entireties.

TECHNICAL FIELD

The present invention relates to a composition comprising a monochlorotrifluoropropene and a stabilizer composed of at least one type selected from the group consisting of a carboxylic acid, a carboxylic acid salt and a carboxylic acid ion, and its applications.

BACKGROUND ART

A hydrofluorochlorocarbon (hereinafter referred to also as HCFC) excellent in nonflammability, low-toxicity and stability, has been used as a diluting solvent for oil stain cleaning, flux cleaning, dust cleaning, a moisture removal solvent, a dry cleaning solvent, a reaction solvent, a lubricant, etc. However, since HCFC presents an adverse impact on the ozone layer, the production of HCFC has been phased out in developed countries.

As a solvent which does not adversely affect the ozone layer, a perfluorocarbon (hereinafter referred to also as PFC), a hydrofluorocarbon (hereinafter referred to also as HFC), a hydrofluoroether (hereinafter referred to also as HFE) or the like is known.

However, due to their high global warming potential, HFC and PFC are regulated substances under the Kyoto Protocol. Besides, since the solubility of oils is lower as compared with HCFC, the application range of HFC, HFE and PFC is limited.

As a new solvent to be replaced with the above solvents, a hydrochlorofluoroolefin (hereinafter referred to also as HCFO) is known, and as HCFO, a monochlorotrifluoropropene has been proposed (Patent Document 1).

Such a monochlorotrifluoropropene has a short lifespan in the atmosphere since it is decomposable, and it has a low ozone depletion potential or global warming potential.

On the other hand, because it is easily decomposable, it is less stable, and has a problem such that when used as a cleaning agent or coating solvent, it decomposes and becomes acidic during use.

Further, Patent Document 2 discloses a method for producing 1-chloro-2,3,3-trifluoropropene (hereinafter referred to also as 1233yd), as one type of monochlorotrifluoropropene. However, 1233yd had a problem of being decomposed to 1-chloro-3,3-difluoropropene by a dehydrofluorination reaction upon contact with a metal.

PRIOR ART DOCUMENTS

Patent Documents

Patent Document 1: JP-A-2013-504658
Patent Document 2: WO2017/018412

DISCLOSURE OF INVENTION

Technical Problems

The present invention has been made to solve the above-mentioned problems, and has a purpose of providing a composition, a cleaning agent, a composition for forming a coating film or an aerosol composition, which is excellent in solubility of various organic substances, presents no adverse effects to global environment and is excellent in stability, and a cleaning method using the composition, a method for forming a coating film using the composition, a heat transfer medium containing the composition and a heat cycle system using the heat transfer medium, and in particular, to provide a composition in which decomposition of a monochlorotrifluoropropene as the active ingredient, is suppressed.

Solution to the Problems

The present inventors have studied the above-mentioned problems and found it possible to solve the problems by the following constructions.

(1) A composition comprising a monochlorotrifluoropropene and a stabilizer composed of at least one type selected from the group consisting of a carboxylic acid, a carboxylic acid salt and a carboxylic acid ion, characterized in that the content of the stabilizer is from 0.1 to 500 mass ppm to the total content of the monochlorotrifluoropropene and the stabilizer.

(2) The composition according to (1), wherein the monochlorotrifluoropropene is 1-chloro-2,3,3-trifluoropropene.

(3) The composition according to (1), wherein the monochlorotrifluoropropene is 1-chloro-3,3,3-trifluoropropene.

(4) The composition according to any one of (1) to (3), wherein the carboxylic acid is acetic acid, formic acid or fluoroacetic acid.

(5) The composition according to any one of (1) to (4), wherein the carboxylic acid salt is a salt formed from the carboxylic acid and a sodium salt, potassium salt, calcium salt, amine salt or quaternary ammonium ion.

(6) The composition according to any one of (1) to (5), wherein the total content of the monochlorotrifluoropropene and the stabilizer in the entire amount of the composition is at least 80 mass %.

(7) A cleaning agent comprising the composition as defined in any one of (1) to (6).

(8) A cleaning method comprising bringing the composition as defined in any one of (1) to (6) into contact with the surface of an article to remove a stain attached to the surface of the article.

(9) The cleaning method according to (8), wherein the material of the surface of the article is composed of at least one type selected from the group consisting of a fiber, a metal, a resin, a rubber, glass and a ceramic.

(10) The cleaning method according to (8) or (9), wherein the stain is composed of at least one type selected from the group consisting of carbon, oil and dust.

(11) A composition for forming a coating film comprising a non-volatile organic compound and the composition as defined in any one of (1) to (6).

(12) A method for forming a coating film, comprising applying the composition for forming a coating film as defined in (11) to the surface of a substrate, and then evaporating off the monochlorotrifluoropropene to form a coating film containing the non-volatile organic compound.

(13) An aerosol composition comprising the composition as defined in any one of (1) to (6).

(14) A heat transfer medium for a heat cycle system comprising the composition as defined in any one of (1) to (6).

(15) A heat cycle system using the heat transfer medium as defined in (14).

Advantageous Effects of Invention (Composition)

The composition of the present invention comprises a monochlorotrifluoropropene and a stabilizer (hereinafter referred to also as "the present stabilizer") composed of at least one type selected from the group consisting of a carboxylic acid, a carboxylic acid salt and a carboxylic acid ion.

In the composition of the present invention, the content of the present stabilizer to the total amount of the monochlorotrifluoropropene and the present stabilizer is from 0.1 to 500 mass ppm. When the content of the present stabilizer is within the above range, the stability of the monochlorotrifluoropropene is excellent, decomposition of the monochlorotrifluoropropene due to the presence of an alkali or the contact with a metal, etc. is inhibited, and corrosion of the object is also prevented.

(Monochlorotrifluoropropene)

The monochlorotrifluoropropene of the present invention is an olefin having a double bond between carbon atom-carbon atom. Therefore, its lifetime in the atmosphere is short, and its ozone depletion potential and global warming potential are small.

The monochlorotrifluoropropene is excellent in solubility of various hydrophobic solutes and has sufficient properties as a diluting solvent for cleaning agents and lubricants. Further, the monochlorotrifluoropropene has a boiling point which is easy to handle at the time of use, and can be recovered and reused, whereby its costs can be kept down.

The monochlorotrifluoropropene includes 1233yd, 1-chloro-3,3,3-trifluoropropene (hereinafter referred to also as 1233zd), etc. As the monochlorotrifluoropropene in the composition of the present invention, 1233yd and 1233zd are preferred.

(1233yd)

Stereoisomers of 1233yd are known to exist, and the Z isomer of 1233yd (hereinafter referred to also as 1233yd(Z)) has a boiling point of 54° C., and the E isomer of 1233yd (hereinafter referred to also as 1233yd(E)) has a boiling point of 46° C. By known production methods, 1233yd(Z), 1233yd(E), and their mixtures can be obtained, and the two can be separated by distillation.

1233yd as a solvent has the following characteristics.

Having the above boiling point, 1233yd is highly volatile and easy to handle.

1233yd has no flash point.

1233yd has low surface tension and viscosity and evaporates easily even at room temperature.

1233yd is excellent in cleaning and removing processing oils, fluorinated oils, silicone oils, synthetic oils, mold release agents, dust, etc. and in solubility of lubricants such as fluorinated oils, silicone oils, etc.

1233yd may be produced, for example, by a method of subjecting 1-chloro-2,2,3,3-tetrafluoropropane (hereinafter referred to also as 244ca) to a dehydrofluorination reaction at a temperature of from 50 to 80° C. with potassium hydroxide or sodium hydroxide as a reactant.

Further, as the production method for 1233yd, a method of subjecting 1,2-dichloro-2,3,3-trifluoropropane (hereinafter referred to also as 243ba) to a dehydrogen chloride reaction, or a method of reacting 1,1,3,3-tetrachloro-2-fluoropropane (hereinafter referred to also as 241ea), 1,1,2,3-tetrachloro-2-fluoropropane (hereinafter referred to also as 241ba) or 1,3,3-trichloro-2-fluoropropene (hereinafter referred to also as 1231yd) with hydrogen fluoride, may be mentioned.

By subjecting the 1233yd obtained by the above methods to distillation and purification, it is possible to obtain 1233yd (Z) or 1233yd(E). As 1233yd to be contained in the composition of the present invention, it may be only one of the two isomers, but it may also be a mixture of the isomers. In consideration of the productivity, it is preferably a mixture of the isomers having a high percentage of 1233yd(Z).

Impurities such as 244ca as raw material, by-products and moisture are present in 1233yd obtained by the above methods. The content of the impurities in 1233yd is preferably at most 1 mass %, more preferably at most 0.5 mass %, from the viewpoint of excellent solubility of lubricants and making the impact on the global environment to be less. That is, the purity of 1233yd is preferably at least 99 mass %, more preferably at least 99.5 mass %. The purity of 1233yd can be increased by distillation and purification, water washing, solid adsorption treatment, etc.

The moisture content of 1233yd is preferably at most 2000 mass ppm, more preferably at most 100 mass ppm, to the entire mass of the composition. When the moisture content of 1233yd is at most the above upper limit value, it is possible to prevent 1233yd from being altered by decomposition, etc. during storage, etc.

As a method of removing moisture in 1233yd, for example, a method of using zeolite as a dehydrating agent may be mentioned. Zeolite may be natural or synthetic, and synthetic zeolite is preferred for its stable quality and ease of availability.

As commercial zeolite products, for example, the following may be mentioned.

"Molecular Sieves 3A", "Molecular Sieves 4A", "Molecular Sieves 5A", and "Molecular Sieves 13X" manufactured by Union Carbide Corp.

"Zeolum A-3", "Zeolum A-4", "Zeolum A-5", and "Zeolum F-9" manufactured by Tosoh Corporation.

Type 3A and 4A zeolites such as "Molecular Sieves 3A", "Molecular Sieves 4A", "Zeolum A-3" and "Zeolum A-4" are preferred as zeolites.

(1233zd)

1233zd is known to have stereoisomers, and the Z isomer of 1233zd (hereinafter referred to also as 1233zd(Z)) has a boiling point of 40° C., and the E isomer of 1233zd (hereinafter referred to also as 1233zd(E)) has a boiling point of 19° C. By known production methods, 1233zd(Z), 1233zd(E), and their mixtures can be obtained, and the two can be separated by distillation.

1233zd as a solvent has the following characteristics.

Having the above boiling point, 1233zd is highly volatile and easy to handle.

1233zd has no flash point.

1233zd has low surface tension and viscosity and evaporates easily even at room temperature.

1233zd is excellent in cleaning and removing processing oils, fluorinated oils, silicone oils, synthetic oils, mold release agents, dust, etc. and in solubility of lubricants such as fluorinated oils and silicone oils.

1233zd can be produced by known methods.

For example, as described in JP-A-2009-263365, a method of dehydrofluorinating 3-chloro-1,1,1,3-tetrafluoropropane (hereinafter referred to also as 244fa) in the presence of a catalyst, may be mentioned. By distillation and purification of 1233zd obtained by the above method, 1233zd(Z) or 1233zd(E) can be obtained. As 1233zd to be contained in the composition of the present invention, it may be only one of the two isomers, but it may also be a mixture of the isomers.

Impurities such as 244fa as raw material, by-products and moisture, are present in 1233zd obtained by the above method. The content of the impurities in 1233zd is preferably at most 1 mass %, more preferably at most 0.5 mass %, from the viewpoint of excellent solubility of lubricants and the impact on global environment is small. That is, the purity of 1233zd is at least 99 mass %, more preferably at least 99.5 mass %. The purity of 1233zd can be increased by distillation and purification, water washing, solid adsorption treatment, etc.

The content of the monochlorotrifluoropropene in the composition of the present invention is preferably at least 70 mass %, more preferably at least 80 mass %, further preferably at least 90 mass %, particularly preferably at least 95 mass %, most preferably at least 99 mass %, to the entire mass of the composition. When it is at least the above lower limit value, the effect of the present invention is sufficiently demonstrated.

(The Present Stabilizer)

As the composition of the present invention comprises a monochlorotrifluoropropene and the present stabilizer, the decomposition of the monochlorotrifluoropropene by the presence of alkali or by the contact with a metal, etc. is suppressed and the composition is stabilized. The stabilizer in the present invention is one having the effect of suppressing the decomposition of the monochlorotrifluoropropene by the presence of alkali or by the contact with a metal, etc. As the case requires, two or more carboxylic acids may be contained.

As the carboxylic acid being the present stabilizer, formic acid, acetic acid and fluoroacetic acid are preferred. Fluoroacetic acid is a generic term for monofluoroacetic acid, difluoroacetic acid and trifluoroacetic acid, and as the fluoroacetic acid being the present stabilizer, difluoroacetic acid and trifluoroacetic acid are preferred. In the composition of the present invention, these carboxylic acids may be present in the form of carboxylic acid salts or carboxylic acid ions. Although not necessarily clear, they can also exist as carboxylic acid salts and carboxylic acid ions when coexisting with water contained in the monochlorotrifluoropropene, and it is believed that the effect of the present invention will be fully demonstrated even in such cases.

When forming carboxylic acid salts, sodium, potassium, calcium, amine and quaternary ammonium salts are preferred as the bases, and amine and quaternary ammonium salts are more preferred.

In the composition of the present invention, carboxylic acid salts may be added to the monochlorotrifluoropropene, and carboxylic acid salts may be formed in the composition from carboxylic acids and the above bases.

The stability of the monochlorotrifluoropropene can be evaluated, for example, by using the chlorine ion or fluorine ion concentration as an indicator after a test solution of the present stabilizer dissolved in the monochlorotrifluoropropene at a predetermined ratio is stored for a certain period. The chlorine ion or fluorine ion concentration is measured by ion chromatography.

When the composition of the present invention in which the content of the present stabilizer to the total content of the monochlorotrifluoropropene and the present stabilizer is 0.1 mass ppm, is stored at 50° C. for 3 days, in a case where the monochlorotrifluoropropene is 1233yd, the chlorine ion or fluorine ion concentration in the composition can be made to be at most 0.2 mass ppm, in a case where the monochlorotrifluoropropene is 1233zd(Z), the chlorine ion or fluorine ion concentration in the composition can be made to be at most 1.1 mass ppm, and in a case where the monochlorotrifluoropropene is 1233zd(E), the chlorine ion or fluorine ion concentration in the composition can be made to be at most 0.2 mass ppm.

The content of the present stabilizer to the total content of the monochlorotrifluoropropene and the present stabilizer in the composition of the present invention, is preferably from 0.1 to 100 mass ppm, more preferably from 0.1 to 50 mass ppm, further preferably from 0.1 to 10 mass ppm, particularly preferably from 0.5 to 10 mass ppm, most preferably from 1 to 10 mass ppm. When it is at least the above lower limit value, it is particularly excellent in that not only it shows sufficient stability against the monochlorotrifluoropropene, but it does not impair the characteristics of the monochlorotrifluoropropene, such as low surface tension and viscosity and good permeability. When it is at most the above upper limit value, corrosion of an object such as a metal can be prevented.

The composition of the present invention may contain an organic compound other than the monochlorotrifluoropropene and the present stabilizer. As such another organic compound, an organic compound which is compatible with the monochlorotrifluoropropene and which is used in the same applications as the monochlorotrifluoropropene, may be mentioned. As such an organic compound (hereinafter referred to also as organic compound (A)), it is preferably an organic compound to be used for applications as a solvent, cleaning agent, injector, heat transfer medium, etc., and it is more preferably an organic compound to be used as a solvent.

(Organic Compound (A))

The organic compound (A) is preferably an organic compound soluble in the monochlorotrifluoropropene. The organic compound (A) is suitably selected depending on various purposes, such as increasing the solubility and adjusting the volatilization rate.

As the organic compound (A), a hydrocarbon, an alcohol, a ketone, a non-fluorinated ether, an ester, a chlorocarbon, HFC, HFE, HCFO other than the monochlorotrifluoropropene, a hydrofluoroolefin (hereinafter referred to also as HFO), etc. soluble in the monochlorotrifluoropropene, may be mentioned.

The content of the organic compound (A) is preferably at most 30 mass %, more preferably at most 20 mass %, further preferably at most 10 mass %, particularly preferably at most 5 mass %, most preferably at most 1 mass %, to the entire amount of the composition.

As the hydrocarbon, a hydrocarbon with a number of carbon atoms of at least 5 is preferred. The hydrocarbon may be chained or cyclic, and may be a saturated hydrocarbon or an unsaturated hydrocarbon.

As the hydrocarbon, n-pentane, cyclopentane, n-hexane, cyclohexane and n-heptane are preferred.

As the alcohol, a $C_{1-16}$ alcohol is preferred. The alcohol may be chained or cyclic. Further, the alcohol may be a saturated alcohol or an unsaturated alcohol.

As the alcohol, methanol, ethanol and isopropyl alcohol are preferred.

As the ketone, a $C_{3-9}$ ketone is preferred. The ketone may be chained or cyclic, and may be a saturated ketone or an unsaturated ketone.

As the ketone, acetone and methyl ethyl ketone are preferred.

As the non-fluorinated ether, a $C_{2-8}$ ether is preferred. The non-fluorinated ether may be chained or cyclic, and may be a saturated ether or an unsaturated ether.

As the ether, diethyl ether, diisopropyl ether and tetrahydrofuran are preferred.

As the ester, a $C_{2-19}$ ester is preferred. The ester may be chained or cyclic, and may be a saturated ester. The ester may be an unsaturated ester.

As the ester, methyl acetate and ethyl acetate are preferred.

As the chlorocarbon, a $C_{1-3}$ chlorocarbon is preferred. The chlorocarbon may be chained or cyclic. Further, the chlorocarbon may be a saturated chlorocarbon or an unsaturated chlorocarbon.

As the chlorocarbon, methylene chloride, trans-1,2-dichloroethylene and trichloroethylene are more preferred.

As HFC, a $C_{4-8}$ linear or cyclic HFC is preferred, and a HFC with the number of fluorine atoms in one molecule being at least the number of hydrogen atoms is more preferred.

As HFC, 1,1,1,2,2,3,4,5,5,5-decafluoropentane, 1,1,1,2,2, 3,3,4,4-nonafluorohexane, and 1,1,1,2,2,3,3,4,4,5,5,6,6-tri-decafluorohexane are preferred.

As HFE, 1,1,2,2-tetrafluoroethoxy-1-(2,2,2-trifluoro)ethane (hereinafter referred to also as HFE-347pc-f), etc. are preferred.

As HCFO other than a monochlorotrifluoropropene, E-isomer and Z-isomer of 1-chloro-2,3,3,3-tetrafluoropropene (hereinafter referred to also as 1224yd) are preferred.

As HFO, methoxyperfluoroheptene, 1,1,1,4,4,4-hexafluoro-2-butene, etc., are preferred.

The organic compound (A) to be contained in the composition of the present invention may be two or more types. Further, in a case where two or more types of the organic compound (A) are contained, for example, to be used as a solvent, they may be a combination of solvents in the same category or a combination of solvents in different categories. For example, they may be a combination of two types selected from hydrocarbons, or a combination of one type selected from hydrocarbons and one type selected from alcohols.

The organic compound (A) is preferably a solvent which does not have a flash point. As the organic compound which does not have a flash point, HFC such as 1,1,1,2,2,3,4,5,5, 5-decafluoropentane, 1,1,1,2,2,3,3,4,4-nonafluorohexane or 1,1,1,2,2,3,3,4,4,5,5,6,6-tridecafluorohexane, HFE such as HFE-347pc-f, HCFO other than monochlorotrifluoropropene such as 1224yd, or HFO such as methoxyperfluoroheptene or 1,1,1,4,4,4-hexafluoro-2-butene, may be mentioned. In a case where a solvent having a flash point is to be used as the organic compound (A), it is preferred to use it within a range where not to have a flash point as the composition.

(Other Stabilizers)

In order to enhance the stability of the composition of the present invention, stabilizers other than the present stabilizer may be contained. As such other stabilizers, a phenol, an ether, an epoxide, an amine, an alcohol and a hydrocarbon may be mentioned. When the composition of the present invention contains such other stabilizers, it is possible to prevent the decomposition of the monochlorotrifluoropropene due to oxidative action.

In a case where the composition of the present invention contains such other stabilizers, the content of such other stabilizers is preferably at least 1 mass ppm, more preferably at least 3 mass ppm, particularly preferably at least 5 mass ppm, to the entire amount of the monochlorotrifluoropropene in the composition. Further, the content of such other stabilizers is preferably at most 5 mass %, particularly preferably at most 1 mass %, to the entire amount of the monochlorotrifluoropropene in the composition.

As the above-mentioned other stabilizers, a nitro compound such as nitromethane, nitroethane, nitropropane or nitrobenzene, an amine such as diethylamine, triethylamine, isopropylamine, diisopropylamine, butylamine, isobutylamine, tert-butylamine, α-picoline, N-methylbenzylamine, diallylamine, N-methylmorpholine or N-methylpyrrole, a phenol such as phenol, o-cresol, m-cresol, p-cresol, thymol, p-tert-butylphenol, tert-butylcatechol, catechol, isoeugenol, o-methoxyphenol, 4,4'-dihydroxyphenyl-2,2-propane, isoamyl salicylate, benzyl salicylate, methyl salicylate or 2,6-di-t-butyl-p-cresol, a benzotriazole such as 2-(2'-hydroxy-5'-methylphenyl)benzotriazole, 2-(2'-hydroxy-3'-t-butyl-5'-methylphenyl)-5-chlorobenzotriazole or 1,2,3-benzo-triazole, 1-[(N,N-bis-2-ethylhexyl)aminomethyl]benzotriazole, an epoxy compound such as 1,2-propylene oxide, 1,2-butylene oxide, 1,4-dioxane, butyl glycidyl ether or phenyl glycidyl ether, isoamylene, 2,4,4-trimethyl-1-pentene, 2,4, 4-trimethyl-2-pentene, diisobutylene, etc. may be mentioned.

Other stabilizers to be contained in the composition of the present invention may be two or more types.

The composition of the present invention does not adversely affect the global environment, is excellent in stability and is excellent in solubility of hydrophobic substances such as oils and mineral oils.

Because of its excellent performance as a solvent, the composition of the present invention can be used as a cleaning agent for removing hydrophobic substances, such as oil stain cleaning, flux cleaning, precision cleaning, and dry cleaning and stain removal of clothing.

Further, the composition of the present invention can be used as a solvent to form a coating film of a hydrophobic substance such as a lubricant, such as a silicone lubricant or a fluorine lubricant, a rust inhibitor made of a mineral oil, synthetic oil, etc., a moisture-proof coating agent to apply water repellent treatment, and an antifingerprint coating agent to apply antifouling treatment. That is, the above hydrophobic substance is dissolved in the composition of the present invention to make a composition for forming a coating film, the composition for forming a coating film is applied to the surface of a substrate, and then the monochlorotrifluoropropene (and the organic compound (A) in the composition of the present invention containing the organic compound (A)) is evaporated off to form a coating film of the above hydrophobic substance. The evaporation removal of the monochlorotrifluoropropene, including the case where the organic compound (A) is also evaporated off together with the monochlorotrifluoropropene, will be hereinafter referred to also as "evaporation removal of the solvent".

Further, the composition of the present invention is suitable also as a heat transfer medium for heating or cooling an article.

(Cleaning Agent, and Method for Cleaning an Article)

The cleaning agent of the present invention is characterized in that it comprises the above-described composition of the present invention.

The cleaning method of the present invention is characterized by bringing the above-described composition of the present invention into contact with an article to remove a stain attached on the article.

As a specific cleaning method, the above-described composition of the present invention may be brought into contact with the surface of the article. Although not particularly limited, for example, hand wiping, dipping, spraying, shaking, ultrasonic, steam cleaning, or a combination of these methods may be employed. As cleaning equipment, cleaning conditions, etc., conventional ones may suitably be selected, and the composition can be used repeatedly over a long period of time without decomposition.

As cleaning apparatus and cleaning method, for example, the cleaning apparatus and cleaning method shown in WO2008/149907 may be mentioned.

In a case where by using the composition of the present invention, cleaning is carried out by the cleaning apparatus shown in WO2008/149907, it is preferred to set the temperature of the composition of the present invention in the first immersion tank to be at least 25° C. and less than the boiling point of the composition. Within the above temperature range, cleaning of processing oil and other contaminants can easily be conducted, and the cleaning effects by ultrasonic waves will be high. It is also preferred to set the temperature of the composition of the present invention in the second immersion tank to be from 10 to 35° C. Within the above temperature range, the rinsing and cleaning effect will be high. Further, it is also preferred that the temperature of the composition of the present invention in the first immersion tank be higher than the temperature of the composition in the second immersion tank, from the viewpoint of washability.

As the material for the surface of the article to which the composition of the present invention may be applied, a metal, a resin, an elastomer, glass, ceramic or the like may be mentioned. Further, the article is an article having a surface made of such a material, on which the composition of the present invention will be in contact. As the article, an article made of such a material, an article having a surface made of such a material and a non-surface material other than such a material, and an article made of a composite material having two or more of these materials, may be mentioned. As the composite material, a laminate of a metal and a resin may be mentioned.

Specific examples of the article include a textile product, a medical instrument, an electrical or electronic equipment, a precision machinery, an optical equipment engineering article, a transportation machinery, and their parts. Specific examples of the electrical or electronic equipment, the precision machinery, the optical equipment engineering article, the transportation machinery and their parts include an electric wire, a fuse, a current controller, a transformer, an electric heater, a capacitor, a resistor such as a thermistor, a transformer, an inductor, a switch, a connector, an acoustic part such as a speaker, a sensor for light or heat, an actuator for a motor, a power supply component, a crystal resonator, a crystal oscillator, a filter, an antenna component, ICs mounted with these components, a capacitor, a printed circuit board, a micro motor, a relay, an optical lens, a glass substrate, a bearing, a gear, a chain, a brake optical lens, a glass substrate, etc.

When the object to be cleaned is a metal, etc., by using the composition of the present invention, it is possible to remove adhered substances while preventing corrosion of the object to be cleaned.

As attachments to be cleaned and removed in the cleaning method of the present invention, a flux, a processing oil and a mold release agent attached to various types of the article to be cleaned, and a dust adhered through them, may be mentioned. As the processing oil, cutting oil, quenching oil, rolling oil, lubricating oil, machine oil, press working oil, punching oil, drawing oil, assembly oil, wire drawing oil, etc., may be mentioned. Since the present composition is superior in solubility of these oils as compared to conventional compositions such as HFC and HFE, it is preferred to use the present composition for cleaning a stain consisting of these oils. In particular, in a case where a water-soluble cutting oil is an attachment, by using the composition of the present invention, it is possible to prevent the decomposition of the monochlorotrifluoropropene contained in the composition. Here, as the water-soluble cutting oil, Yushiroken EC50, Yushiroken FGS795, and Yushiroken FGC836 (each manufactured by Yushiro Chemical Industry Co., Ltd.) may be mentioned.

(Composition for Forming Coating Film, Method for Producing Coating Film-Attached Substrate)

The composition of the present invention can also be used as a solvent to form a coating film of a non-volatile organic compound.

The composition for forming a coating film is characterized in that it comprises a non-volatile organic compound and the above-described composition of the present invention.

The method for producing a coating film-attached substrate of the present invention is characterized in that the above-described composition for forming the coating film of the present invention is applied to the surface of a substrate, and then the solvent is evaporated and removed to form a coating film of the above non-volatile organic compound. Here, the surface of the substrate in contact with the composition of the present invention is made of a material which will not be affected by the composition of the present invention, similar to the material of the above-described surface of the article.

The composition for forming a coating film is usually prepared as a solution composition having the non-volatile organic compound dissolved in the solution composition of the present invention. The method for preparing the composition for forming a coating film is not particularly restricted so long as it is a method whereby the non-volatile organic compound can be uniformly dissolved at a predetermined ratio in the composition of the present invention. The composition for forming a coating film basically consists only of the non-volatile organic compound and the composition of the present invention.

The content of the non-volatile organic compound in the above-described composition for forming a coating film (100 mass %) is preferably from 0.01 to 50 mass %, more preferably from 0.05 to 30 mass %, particularly preferably from 0.1 to 20 mass %. When the content of the non-volatile organic compound is within the above range, the film thickness of the coating film when the composition for forming a coating film is applied and the thickness of the non-volatile organic compound coating film after evaporation and removal of the solvent (hereinafter referred to also as "drying") can be easily adjusted to be within a proper range.

Here, the non-volatile organic compound in the present invention is one of which the boiling point is higher than that of the composition of the present invention and in which a non-volatile organic compound will remain on the surface after the solvent has been evaporated and removed. As the non-volatile organic compound, specifically a lubricant for imparting lubricity to an article, a rust inhibitor for imparting rust inhibiting effects to a metal part, a moisture-proof coating agent for imparting water repellency to an article, and an anti-fouling coating agent such as a fingerprint removal and anti-adhesion agent for imparting anti-fouling performance to an article, may be mentioned. In the method for producing a coating film-attached substrate of the present invention, it is preferred to use a lubricant as the non-volatile organic compound from the viewpoint of solubility.

A lubricant means one to be used to reduce friction at the contact surfaces and prevent heat generation or friction damage when two components are in motion with their surfaces in contact with each other. The lubricant may be in any form of liquid (oil), semi-solid (grease) or solid.

As the lubricant, from such a viewpoint that the solubility in the composition of the invention is excellent, a mineral oil-type lubricant, a synthetic oil-type lubricant, a fluorinated lubricant or a silicone-type lubricant is preferred. Here, the fluorinated lubricant means a lubricant which has fluorine atoms in its molecule. Further, the silicone-type lubricant means a lubricant containing silicone. The lubricant contained in the composition for forming a coating film may be one type or two or more types. A fluorinated lubricant and a silicone-type lubricant may each be used alone, or they may be used in combination.

As the fluorinated lubricant, a fluorinated solid lubricant such as a fluorinated oil, a fluorinated grease, or a resin powder of polytetrafluoroethylene, may be mentioned.

As the fluorinated oil, a low-polymerized product of perfluoropolyether or chlorotrifluoroethylene is preferred. For example, product names "Krytox (registered trademark) GPL102" (manufactured by Du Pont), "Daifloil #1", "Daifloil #3", "Daifloil #10", "Daifloil #20", "Daifloil #50", "Daifloil #100", "Demnum S-65" (manufactured by Daikin Industries, Ltd.), etc. may be mentioned.

As the fluorinated grease, one using a fluorinated oil such as a low-polymerized product of perfluoropolyether or chlorotrifluoroethylene as the base oil and having a powder of polytetrafluoroethylene powder or another thickening agent added thereto, is preferred. For example, product names "Krytox (registered trademark) Grease 240AC" (manufactured by Du Pont), "Daifloil Grease DG-203", "Demnum L65", "Demnum L100" and "Demnum L200" (manufactured by Daikin Industries, Ltd.), "Sumitec F936" (manufactured by Sumico Lubricant Co., Ltd.), "Molykote (registered trademark) HP-300", "Molykote (registered trademark) HP-500", "Molykote (registered trademark) HP-870", "Molykote (registered trademark) 6169", etc. may be mentioned.

As the silicone lubricant, silicone oil or silicone grease may be mentioned.

As the silicone oil, dimethyl silicone, methylhydrodiene silicone, methylphenyl silicone, cyclic dimethyl silicone, or a modified silicone oil having an organic group introduced into the side chain or terminal, is preferred. For example, product names "Shin-etsu Silicone KF-96", "Shin-etsu Silicone KF-965", "Shin-etsu Silicone KF-968", "Shin-etsu Silicone KF-868", "Shin-etsu Silicone KF-99", "Shin-etsu Silicone KF-50", "Shin-etsu Silicone KF-54", "Shin-etsu Silicone HIVAC F-4", "Shin-etsu Silicone HIVAC F-5", "Shin-etsu Silicone KF-56A", "Shin-etsu Silicone KF-995", "Shin-etsu Silicone KF-868", "Shin-etsu Silicone KF-859" (manufactured by Shin-Etsu Chemical Co., Ltd.), "SH200", "MDX4-4159" (manufactured by Toray Dow Corning, Inc.), etc. may be mentioned.

As the silicone grease, a product using a various silicone oil listed above as the base oil and having a thickening agent such as a metallic soap and various additives added, may be mentioned. For example, product names "Shin-etsu Silicone G-30 series", "Shin-etsu Silicone G-40 series", "Shin-etsu Silicone FG-720 series", "Shin-etsu Silicone G-411", "Shin-etsu Silicone G-501", "Shin-etsu Silicone G-6500", "Shin-etsu Silicone G-330", "Shin-etsu Silicone G-340", "Shin-etsu Silicone G-350", "Shin-etsu Silicone G-630" (manufactured by Shin-Etsu Chemical Co., Ltd.), "Molykote (registered trademark) SH33L", "Molykote (registered trademark) 41", "Molykote (registered trademark) 44", "Molykote (registered trademark) 822M", "Molykote (registered trademark) 111", "Molykote (registered trademark) grease for high vacuum", "Molykote (registered trademark) thermal diffusion compound" (manufactured by Toray Dow Corning, Inc.), etc. may be mentioned.

The rust inhibitor means one to be used to prevent rusting of a metal material by covering the surface of the metal, which is easily oxidized by oxygen in the air and causes rusting, and by blocking oxygen from the metal surface. As the rust inhibitor, a mineral oil, or a synthetic oil such as a polyol ester, a polyalkylene glycol or a polyvinyl ether, may be mentioned.

As examples of the product of moisture-proof coating agent, Topas 5013, Topas 6013, Topas 8007 (manufactured by Polyplastics Co., Ltd.), Zeonor 1020R, Zeonor 1060R (manufactured by ZEON Corporation), APEL 6011T, APEL 8008T (manufactured by Mitsui Chemicals, Inc.), SFE-DPO2H and SNF-DP2OH (manufactured by Seimi Chemical Co., Ltd.), may be mentioned.

As examples of the product of anti-fingerprint coating agent, Optool DSX and Optool DAC (manufactured by Daikin Industries, Ltd.), Fluorosearch FG-5000 (manufactured by FluoroTechnology Co., Ltd.), and SR-4000A (manufactured by Seimi Chemical Co., Ltd.), may be mentioned.

A coating film made of a non-volatile organic compound is formed on a substrate surface by applying the composition for forming a coating film to the substrate surface to form a film of the composition for forming a coating film on the substrate surface, followed by evaporation and removal of the solvent from the film of the composition for forming a coating film formed on the substrate surface.

As the method for coating the composition for forming a coating film, for example, coating by a brush, coating by a spray, coating by immersing an article in the composition for forming a coating film, or a coating method of sucking up the composition for forming a coating film to bring the composition for forming a coating film into contact with the inner wall of a tube or a syringe needle, may be mentioned.

As the method for evaporating and removing the solvent from the composition for forming a coating film, a known drying method may be mentioned. As the drying method, for example, air drying or drying by heating may be mentioned. The drying temperature is preferably from 20 to 100° C.

By the method for producing a coating film-attached substrate of the present invention, it is possible to produce a coating film-attached substrate, in which a coating film containing a lubricant, a rust inhibitor, a moisture-proof coating agent, a stain-proof coating agent or the like is formed on the surface of the substrate. That is, as the substrate to which the composition for forming a coating film is applied, a substrate having a surface made of a various material such as metal, resin, rubber, glass, ceramics, etc. that will not be affected by the composition of the present invention may be employed. In particular, in a case where the substrate to be coated is a metal or the like, by using the composition of the present invention, it is possible to form a uniform coating film while preventing corrosion of the substrate.

As specific examples of the coating film-attached substrate, as ones in which fluorine-based lubricants are used, industrial equipment, tray parts of CD and DVD in personal computers and audio equipment, home or office equipment such as printers, copying equipment, flux equipment, etc. may be mentioned. As ones in which silicone-type lubricants are used, syringes and cylinders, medical tubing parts, metal blades, catheters, etc. may be mentioned, As ones in which moisture-proof coating agents or stain-proof coating agents are used, equipment used to provide moisture-proof and stain-proof properties to plastic materials, rubberized materials, metal materials, glass materials, mounting recovery plates, etc. may be mentioned.

The composition of the present invention can be used also as an aerosol composition containing a propellant and a solute dissolved in the composition. As the propellant, a liquefied gas or a compressed gas may be mentioned. As the liquefied gas in the aerosol composition, dimethyl ether (DME), liquefied petroleum gas (LPG), propane, butane, isobutane, 1,1-difluoroethane (HFC-152a), 1,1,1,2-tetrafluoroethane (HFC-134a), 2,3,3,3-tetrafluoropropene (HFO-1234yf), 1,3,3,3-tetrafluoropropene (HFO-1234ze), etc. may be mentioned. On the other hand, as the compressed gas, nitrogen, carbon dioxide, nitrous oxide, etc. may be mentioned.

(Solvent)

The composition of the present invention can be used in applications as a solvent to dissolve various substances. The composition of the present invention can dissolve dyes and fluorescent dyes to be used in inks and paints. For example, the composition of the present invention can be used in a method for inspecting scratches on a substrate by dissolving a fluorescent dye in the composition of the present invention, letting the composition containing the fluorescent dye be penetrated into scratches on the substrate, and removing the fluorescent dye remaining on the substrate surface by the composition of the present invention to let the fluorescent dye remain in the scratches.

Further, the composition of the present invention can be used also as a solvent for an adhesive for bonding metals, wood, ceramics, fiber materials, etc., as a solvent for dispersing inorganic particles and a binder such as polyethylene glycol for producing sintered bodies such as ceramics, and as a solvent for chemical synthetic reactions. Furthermore, the composition of the present invention can be used also for applications in which dissolved substances are precipitated as particles with volatilization of the composition, or for applications for purification by precipitating a specific substance from substances dissolved in the composition of the present invention.

(Heat Transfer Medium and Heat Cycle System)

The composition of the present invention can be used as a working medium (heat transfer medium) for a heat cycle system. That is, the present invention provides a heat transfer medium containing the composition of the present invention. The heat transfer medium of the present invention can be applied to a heat cycle system which heats and cools a substance.

As the heat cycle system, a Rankine cycle system, a heat pump cycle system, a refrigeration cycle system, a heat transport system, a secondary refrigerant cooling system, etc. may be mentioned.

In the following, as an example of the heat cycle system, a refrigeration cycle system will be described.

A refrigeration cycle system is a system in which a working refrigerant removes thermal energy by a load fluid in an evaporator to cool the load fluid to further lower the temperature. The refrigeration cycle system is a system comprising a compressor to compress the working medium vapor A to make a high temperature and high pressure working medium vapor B, a condenser to cool and liquefy the compressed working medium vapor B to make a low temperature and high pressure working medium C, an expansion valve to expand the working medium C discharged from the condenser to make a low temperature and low pressure working medium D, an evaporator to heat the working medium D discharged from the expansion valve to make a high temperature and high pressure working medium vapor A, a pump to supply a load fluid E to the evaporator, and a pump to supply a fluid F to the condenser.

Further, the heat transfer medium of the present invention can be applied to a secondary circulation cooling system.

A secondary circulation cooling system is a system comprising a primary cooling mean to cool a primary refrigerant consisting of ammonia or a hydrocarbon refrigerant, a secondary circulation cooling mean to cool an object to be cooled by circulating a secondary refrigerant for a secondary cooling mean system (hereinafter referred to as the "secondary refrigerant"), and a heat exchanger to cool the secondary refrigerant by letting the primary refrigerant and the secondary refrigerant undergo heat-exchange. This secondary circulation cooling system can cool the object to be cooled. The heat transfer medium of the present invention is preferred for use as the secondary refrigerant.

(Analytical Method)

The present stabilizer contained in the composition of the present invention can be extracted as carboxylic acid ions and thus can be detected by ion chromatography. For example, a method of contacting the composition of the present invention with an alkaline aqueous solution, thereby extracting it as carboxylic acid ions, and analyzing them by ion chromatography.

The alkaline aqueous solution is not particularly restricted so long as carboxylic acid ions can be extracted. One which does not produce other types of ions such as carbonate ions is preferred. A potassium hydroxide aqueous solution or sodium hydroxide aqueous solution may be mentioned. Further, the content of the alkali to the entire amount of the alkali aqueous solution is not particularly restricted so long as carboxylic acid ions can be extracted, but from 0.01 to 1 mass % is preferred.

As the ion chromatography, Dionex IonPac AS12A (manufactured by Thermo Scientific), ICS-5000 (manufactured by Thermo Scientific), etc. may be mentioned.

EXAMPLES

In the following, the present invention will be described in detail with reference to Examples. However, the present invention is not limited to these Examples. Ex. 2 to 5, 8 to 11, 14 to 17, 20 to 23, 26 to 29, 32 to 34, 37 to 39, 42 to 44, 47 to 49, 52 to 54 and 57 to 59 are Examples of the composition of the present invention; and Ex. 1, 6, 7, 12, 13, 18, 19, 24, 25, 30, 31, 35, 36, 40, 41, 45, 46, 50, 51, 55, 56 and 60 are Comparative Examples.

The monochlorotrifluoropropene, carboxylic acids, carboxylic acid salts and carboxylic acid ions used in the preparation of the compositions are as shown below.

(Production Example: Production of 244ca)

To a 2-liter four-necked flask equipped with a stirrer, a gymrothe, a cooler and a glass distillation column (5 measured stages) filled with raschig rings, 1204 g (9.12 mol) of 2,2,3,3-tetrafluoropropanol (TFPO) and 12 g (0.17 mol) of N,N-dimethylformamide (DMF) were added. 1078 g (9.12 mol) of thionyl chloride was added dropwise, followed by stirring at room temperature for 12 hours. The reactor was heated to 100° C., and reaction distillation was carried out using a reflux timer with a reflux time/distillation time ratio of 5/1. The distilled 244ca was neutralized with a 20 mass % potassium hydroxide aqueous solution. The recovered 244ca (purity: 100 mass %) was 979 g (6.50 mol).

(Production Example: Production of 1233yd)

A plug-in tube (material: SUS316, inner diameter: 3 mm) was introduced into the center of a vertical fixed-bed reactor (material: SUS316, inner diameter: 22.6 mm×height: 200 mm), and a K-type thermocouple was inserted into it to measure the internal temperature. At the center of the reactor, alumina (N612N, manufactured by JGC Catalysts and Chemicals Ltd.) was filled, and this portion was used as a catalyst layer. The catalyst layer was heated to 300° C. by an electric furnace while supplying nitrogen gas at 300 mL/min and dried. Then, trifluoromethane (R-23) was supplied at 300 mL/min to activate the catalyst for about 10 hours until the composition of the outlet gas stabilized. A feedstock preheating mixing line having a gas feed line and feedstock supply line connected and heated to 70° C., was connected to the top of the reactor.

Nitrogen was supplied to the feedstock preheating mixing line through the gas feed line with the gas flow rate adjusted by using a mass flow controller. As the raw material, 3510 g of 244ca, was supplied into the feedstock preheating mixing line heated to 70° C. through the feedstock feed line with the linear velocity adjusted to 2 cm/sec by using a plunger pump, and the product was continuously taken out from the bottom of the reactor. The product taken out from the bottom of the reactor will be hereafter referred to as exit gas. While maintaining the reaction temperature at 375° C., the reaction was conducted continuously for 100 hours. The recovered exit gas was purified to yield 1010 g of 1233yd(Z) with 100 mass % purity and 147 g of 1233yd(E) with 100 mass % purity.

(Preparation of 1233yd)

1233yd used in Examples was prepared by mixing so that the mass ratio of 1233yd(Z) to 1233yd(E) (1233yd(Z)/1233yd(E)) became 100/0, 95/5, or 90/10, and 2,6-di-t-butyl-p-cresol was added so as to be 10 mass ppm.

(Preparation of Compositions)

Compositions of Ex. 1 to 30 were prepared by mixing 1233yd and the ingredients shown in Table 1 in the mass ratios shown in Table 1. To prepare the compositions, the carboxylic acids used were formic acid (manufactured by FUJIFILM Wako Pure Chemical Corporation), acetic acid (manufactured by FUJIFILM Wako Pure Chemical Corporation), difluoroacetic acid (manufactured by FUJIFILM Wako Pure Chemical Corporation), and trifluoroacetic acid (manufactured by FUJIFILM Wako Pure Chemical Corporation).

(Cleanability/Stability Test)

SPCC specimens (25 mm×30 mm×2 mm thick) dipped in and coated with a 10-fold dilution of cutting oil Yushiroken FGS795 (manufactured by Yushiro Chemical Industry Co., Ltd.) and dried overnight in a dryer at 40° C., were used as test specimens.

Test Example 1

The compositions of Ex. 1 to 30 were prepared 150 ml each, and the compositions were placed each in a 300 ml two-necked flask and heat-refluxed at 40° C. for 72 hours in a heat-refluxing apparatus with a Liebig cooling tube attached to the top of the flask with the above test specimen coexisting in the liquid phase. 72 hours later, the test specimen was taken out, and the following evaluation was conducted. The compositions of Ex. 1 to 30 were evaluated by gas chromatography (GC7890, manufactured by Agilent) for the purity of monochlorotrifluoropropene by area %. 100 g was taken from each composition after testing and contacted with the same mass of ion-exchanged water, and the aqueous layer was collected after separation of the two layers. The collected water layer was measured by ion chromatography (HPIC INTEGRATION system, manufactured by Thermo Scientific, column for anion analysis: Dionex IonPac AS12A) to determine the chlorine ion concentration. Further, SPCC specimens were visually evaluated for changes in appearance before and after the test using the following standards. The results are shown in Table 1.

⊚: No change.

○: Luster disappeared, but no practical problem.

×: Corrosion is present.

Here, the "content of carboxylic acid to the total amount of 1233yd and carboxylic acid" in Tables 1, 2 and 3 discussed below, corresponds to the "content of the total of carboxylic acid, carboxylic acid salts and carboxylic acid ions to the content of the total of monochlorotrifluoropropene, carboxylic acid, carboxylic acid salts and carboxylic acid ions".

TABLE 1

| Ex. | 1233yd isomer ratio 1233ydZ [mass %] | 1233ydE [mass %] | Carboxylic acid Content of carboxylic acid to the total amount of 1233yd and carboxylic acid [mass %] | | 1233yd purity [area %] | Chlorine ions [mass ppm] | Appearance of test specimen |
|---|---|---|---|---|---|---|---|
| 1 | 100 | 0 | Formic acid | 0 | 99.5 | 0.2 | ○ |
| 2 | 100 | 0 | Formic acid | 0.0001 | >99.9 | <0.2 | ⊚ |
| 3 | 100 | 0 | Formic acid | 0.001 | >99.9 | <0.2 | ⊚ |
| 4 | 100 | 0 | Formic acid | 0.01 | >99.9 | <0.2 | ⊚ |
| 5 | 100 | 0 | Formic acid | 0.05 | >99.9 | <0.2 | ⊚ |
| 6 | 100 | 0 | Formic acid | 0.5 | >99.9 | <0.2 | X |
| 7 | 95 | 5 | Formic acid | 0 | 99.5 | 0.2 | ○ |
| 8 | 95 | 5 | Formic acid | 0.0001 | 99.5 | <0.2 | ⊚ |
| 9 | 95 | 5 | Formic acid | 0.001 | >99.9 | <0.2 | ⊚ |
| 10 | 95 | 5 | Formic acid | 0.01 | >99.9 | <0.2 | ⊚ |
| 11 | 95 | 5 | Formic acid | 0.05 | >99.9 | <0.2 | ⊚ |
| 12 | 95 | 5 | Formic acid | 0.5 | >99.9 | <0.2 | X |
| 13 | 90 | 10 | Formic acid | 0 | 99.5 | 0.2 | ○ |
| 14 | 90 | 10 | Formic acid | 0.0001 | >99.9 | <0.2 | ⊚ |
| 15 | 90 | 10 | Formic acid | 0.001 | >99.9 | <0.2 | ⊚ |
| 16 | 90 | 10 | Formic acid | 0.01 | >99.9 | <0.2 | ⊚ |
| 17 | 90 | 10 | Formic acid | 0.05 | >99.9 | <0.2 | ⊚ |
| 18 | 90 | 10 | Formic acid | 0.5 | 99.5 | <0.2 | X |

TABLE 1-continued

| Ex. | 1233yd isomer ratio | | Carboxylic acid | Content of carboxylic acid to the total amount of 1233yd and carboxylic acid [mass %] | 1233yd purity [area %] | Chlorine ions [mass ppm] | Appearance of test specimen |
|---|---|---|---|---|---|---|---|
| | 1233ydZ [mass %] | 1233ydE [mass %] | | | | | |
| 19 | 100 | 0 | Acetic acid | 0 | 99.5 | 0.2 | ○ |
| 20 | 100 | 0 | Acetic acid | 0.0001 | >99.9 | <0.2 | ◎ |
| 21 | 100 | 0 | Acetic acid | 0.001 | >99.9 | <0.2 | ◎ |
| 22 | 100 | 0 | Acetic acid | 0.01 | >99.9 | <0.2 | ◎ |
| 23 | 100 | 0 | Acetic acid | 0.05 | >99.9 | <0.2 | ◎ |
| 24 | 100 | 0 | Acetic acid | 0.5 | >99.9 | <0.2 | X |
| 25 | 100 | 0 | Difluoroacetic acid | 0 | 99.5 | 0.2 | ○ |
| 26 | 100 | 0 | Difluoroacetic acid | 0.0001 | >99.9 | <0.2 | ◎ |
| 27 | 100 | 0 | Difluoroacetic acid | 0.001 | >99.9 | <0.2 | ◎ |
| 28 | 100 | 0 | Difluoroacetic acid | 0.01 | >99.9 | <0.2 | ◎ |
| 29 | 100 | 0 | Difluoroacetic acid | 0.05 | >99.9 | <0.2 | ○ |
| 30 | 100 | 0 | Difluoroacetic acid | 0.5 | >99.9 | <0.2 | X |

As can be seen from Table 1, the compositions of Ex. 2 to 5, 8 to 11, 14 to 17, 20 to 23 and 26 to 29 all have excellent monochlorotrifluoropropene stability, can remove cutting fluid from the specimens, and can also prevent corrosion of the specimens.

For the compositions of Ex. 2, 20 and 26, the compositions were further mixed with trans-1,2-dichloroethylene as the organic compound (A). Specifically, the mixture was made so that the mass ratio expressed as monochlorotrifluoropropene/trans-1,2-dichloroethylene was 80/20.

Also with respect to compositions in Ex. containing this organic compound (A) all had excellent monochlorotrifluoropropene stability and were able to remove cutting fluid from the specimens and further prevent corrosion of the specimens.

Test Example 2

Monochlorotrifluoropropene was changed to 1233zd(Z) (1233Z, manufactured by Central Glass Co., Ltd.), and compositions of Ex. 31 to 45 were prepared, and the same tests and evaluations as in Test Example 1 were conducted. The results are shown in Table 2.

TABLE 2

| Ex | Trifluoropropene | Carboxylic acid | Content of carboxylic acid to the total amount of 1233zdZ and carboxylic acid [mass %] | 1233zdZ purity [area %] | Chlorine ions [mass ppm] | Appearance of test specimen |
|---|---|---|---|---|---|---|
| 31 | 1233zdZ | Formic acid | 0 | 99.5 | 1.3 | ○ |
| 32 | 1233zdZ | Formic acid | 0.0001 | >99.9 | 1.1 | ◎ |
| 33 | 1233zdZ | Formic acid | 0.001 | >99.9 | <1.0 | ◎ |

TABLE 2-continued

| Ex | Trifluoropropene | Carboxylic acid | Content of carboxylic acid to the total amount of 1233zdZ and carboxylic acid [mass %] | 1233zdZ purity [area %] | Chlorine ions [mass ppm] | Appearance of test specimen |
|---|---|---|---|---|---|---|
| 34 | 1233zdZ | Formic acid | 0.01 | >99.9 | <1.0 | ◎ |
| 35 | 1233zdZ | Formic acid | 0.5 | >99.9 | <1.0 | X |
| 36 | 1233zdZ | Acetic acid | 0 | 99.5 | 1.3 | ○ |
| 37 | 1233zdZ | Acetic acid | 0.0001 | >99.9 | 1.1 | ◎ |
| 38 | 1233zdZ | Acetic acid | 0.001 | >99.9 | <1.0 | ◎ |
| 39 | 1233zdZ | Acetic acid | 0.01 | >99.9 | <1.0 | ◎ |
| 40 | 1233zdZ | Acetic acid | 0.5 | >99.9 | <1.0 | X |
| 41 | 1233zdZ | Trifluoroacetic acid | 0 | 99.5 | 1.3 | ○ |
| 42 | 1233zdZ | Trifluoroacetic acid | 0.0001 | >99.9 | 1.1 | ◎ |
| 43 | 1233zdZ | Trifluoroacetic acid | 0.001 | >99.9 | <1.0 | ◎ |
| 44 | 1233zdZ | Trifluoroacetic acid | 0.01 | >99.9 | <1.0 | ○ |
| 45 | 1233zdZ | Trifluoroacetic acid | 0.5 | >99.9 | <1.0 | X |

(Production Example: Production of 1233zd(E))

Into a Hastelloy autoclave with an internal volume of 10 L equipped with a stirrer, zirconium chloride (77.8 g) and dichlorofluoromethane (3620 g) were charged, and while keeping the internal temperature to be at most 0° C., vinylidene fluoride (686 g) was introduced, followed by stirring for 2 hours. Then, while keeping the internal temperature to be at most 0° C., dichlorofluoromethane (3622 g) and vinylidene fluoride (2240 g) were introduced, followed by stirring for 2 hours. After the reaction was completed, the internal temperature of the autoclave was brought back to room temperature, the valve at the outlet of the liquid phase was opened, the content was taken out and filtered through a membrane filter (made of PTFE, pore diameter: 0.5 μm) to obtain the reaction product crude liquid (8580 g). The reaction product crude liquid was analyzed by using gas chromatography, whereby the content of 3,3-dichloro-1,1,1-trifluoropropane (243fa) was 57.4%. The reaction product crude liquid (6680 g) was distilled and purified to obtain 243fa (515 g) with 99.2% purity.

Into a Hastelloy autoclave with an internal volume of 2 L equipped with a stirrer, 243fa (515 g) and tetrabutylammonium chloride (5.13 g) were charged, and the autoclave was heated to 40° C. The reaction temperature was maintained at 40° C., a 20% sodium hydroxide aqueous solution (925 g) was added dropwise over 30 minutes, and stirring was continued for 3 hours, whereupon the organic layer (373 g) was recovered. After washing the recovered organic layer with water, it was analyzed by using gas chromatography, whereby the content of 1233zd(E) was 93.0% and the content of 1233zd(Z) was 5.23%. The organic layer (373 g) was distilled and purified to obtain 1233zd(E) (203 g) with 100% purity.

Test Example 3

The compositions in Ex. 46 to 60 were prepared by changing to 1233zd(E) (produced in the above Production Example) which was synthesized in the required amount by repeating the method in the Production Example, and were each sealed in a sealed PTFE test container in an environment of 40° C. and allowed to stand for 72 hours, whereupon the evaluation was conducted in the same manner as in Test Example 1. The results are shown in Table 3.

TABLE 3

| Ex. | Trifluoropropene | Carboxylic acid Content of carboxylic acid to the total amount of 1233zdE and carboxylic acid [mass %] | 1233zdE purity [area %] | Chlorine ions [mass ppm] | Appearance of test specimen |
|---|---|---|---|---|---|
| 46 | 1233zdE | Formic acid | 0 | 99.5 | 0.2 | ◯ |
| 47 | 1233zdE | Formic acid | 0.0001 | >99.9 | <0.2 | ◎ |
| 48 | 1233zdE | Formic acid | 0.001 | >99.9 | <0.2 | ◎ |
| 49 | 1233zdE | Formic acid | 0.005 | >99.9 | <0.2 | ◎ |
| 50 | 1233zdE | Formic acid | 0.5 | >99.9 | <0.2 | X |
| 51 | 1233zdE | Acetic acid | 0 | 99.5 | 0.2 | ◯ |
| 52 | 1233zdE | Acetic acid | 0.0001 | >99.9 | <0.2 | ◎ |
| 53 | 1233zdE | Acetic acid | 0.001 | >99.9 | <0.2 | ◎ |
| 54 | 1233zdE | Acetic acid | 0.005 | >99.9 | <0.2 | ◎ |
| 55 | 1233zdE | Acetic acid | 0.5 | >99.9 | <0.2 | X |
| 56 | 1233zdE | Trifluoroacetic acid | 0 | 99.5 | 0.2 | ◯ |
| 57 | 1233zdE | Trifluoroacetic acid | 0.0001 | >99.9 | <0.2 | ◎ |
| 58 | 1233zdE | Trifluoroacetic acid | 0.001 | >99.9 | <0.2 | ◎ |
| 59 | 1233zdE | Trifluoroacetic acid | 0.005 | >99.9 | <0.2 | ◯ |
| 60 | 1233zdE | Trifluoroacetic acid | 0.5 | >99.9 | <0.2 | X |

INDUSTRIAL APPLICABILITY

The composition of the present invention is a stable composition which is excellent in solubility of various organic substances, does not adversely affect the global environment and is stabilized and does not decompose. This composition is useful for a wide range of industrial applications, such as cleaning and coating applications, and can be used on articles made of various materials, such as metals, without adverse effects.

What is claimed is:

1. A composition, comprising:
   a monochlorotrifluoropropene; and
   a stabilizer composed of at least one selected from the group consisting of a carboxylic acid, a carboxylic acid salt and a carboxylic acid ion,
   wherein a content of the stabilizer is from 0.1 to 500 mass ppm to a total content of the monochlorotrifluoropropene and the stabilizer.

2. The composition according to claim 1, wherein the monochlorotrifluoropropene is 1-chloro-2,3,3-trifluoropropene.

3. The composition according to claim 1, wherein the monochlorotrifluoropropene is 1-chloro-3,3,3-trifluoropropene.

4. The composition according to claim 1, wherein the carboxylic acid is acetic acid, formic acid or fluoroacetic acid.

5. The composition according to claim 1, wherein the carboxylic acid salt is a salt formed from the carboxylic acid and a sodium salt, potassium salt, calcium salt, amine salt or quaternary ammonium ion.

6. The composition according to claim 1, wherein the total content of the monochlorotrifluoropropene and the stabilizer in the entire amount of the composition is at least 80 mass %.

7. A cleaning agent comprising the composition according to claim 1.

8. A cleaning method comprising:
   contacting the composition according to claim 1 with a surface of an article to remove a stain attached to the surface of the article.

9. The cleaning method according to claim 8, wherein a material of the surface of the article is composed of at least one selected from the group consisting of a fiber, a metal, a resin, a rubber, glass and a ceramic.

10. The cleaning method according to claim 8, wherein the stain is composed of at least one selected from the group consisting of carbon, oil and dust.

11. A composition for forming a coating film, comprising:
    a non-volatile organic compound; and
    the composition according to claim 1.

12. A method for forming a coating film, comprising:
    applying the composition for forming a coating film according to claim 11 to the surface of a substrate and then
    evaporating off the monochlorotrifluoropropene to form a coating film containing the non-volatile organic compound.

13. An aerosol composition comprising the composition according to claim 1.

14. A heat transfer medium for a heat cycle system comprising the composition according to claim 1.

15. A heat cycle system comprising the heat transfer medium according to claim 14.

* * * * *